UNITED STATES PATENT OFFICE.

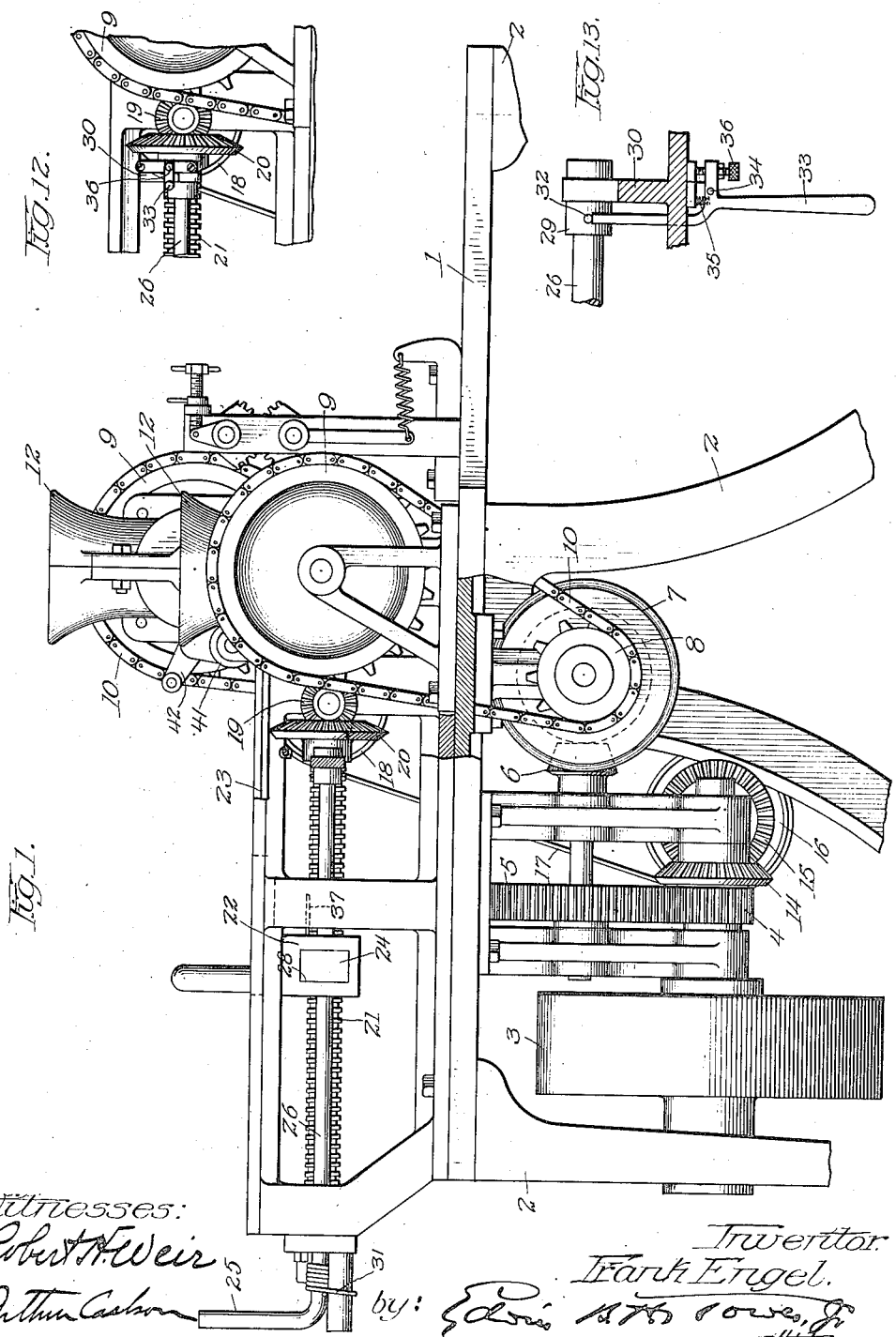

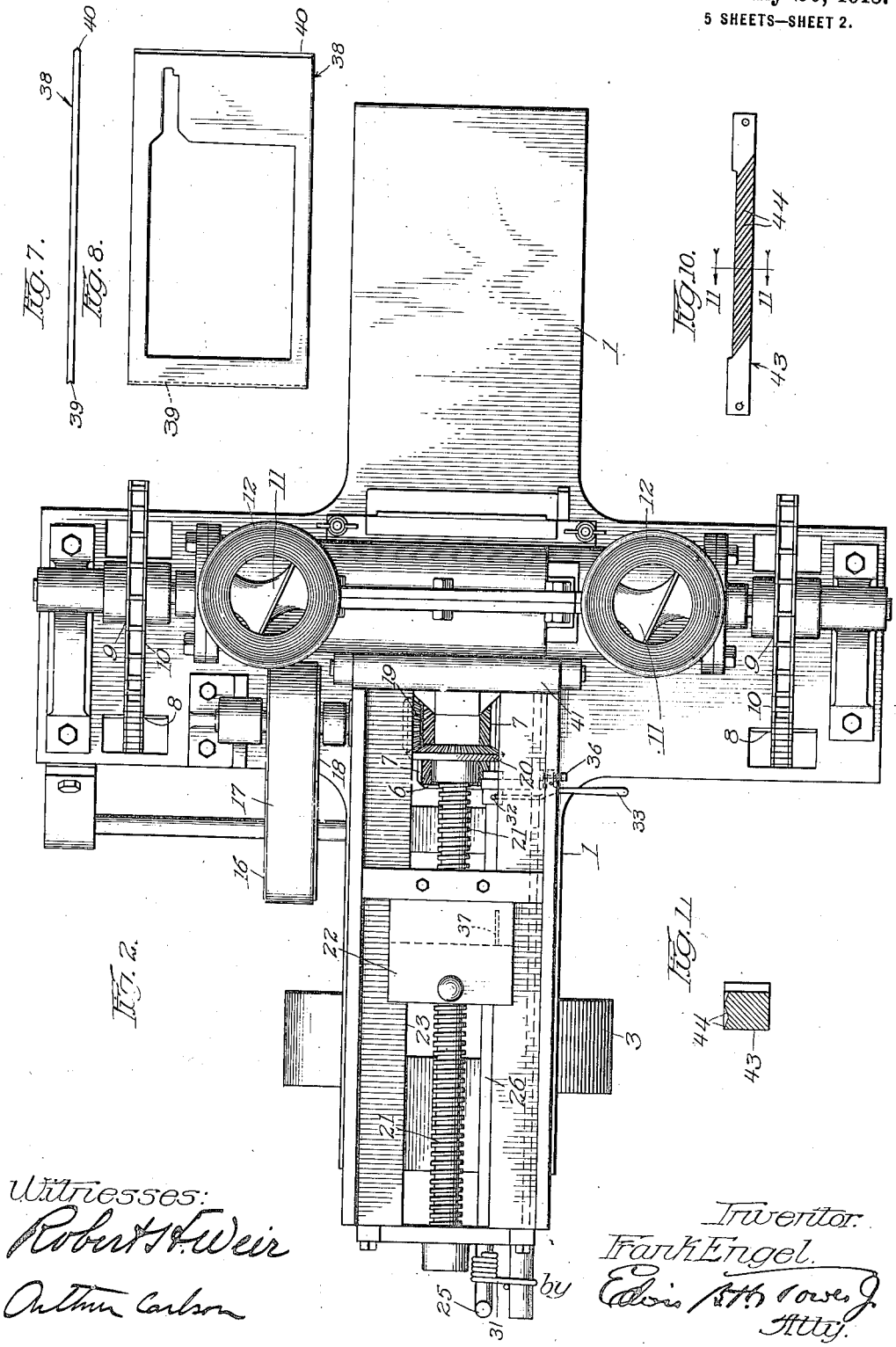

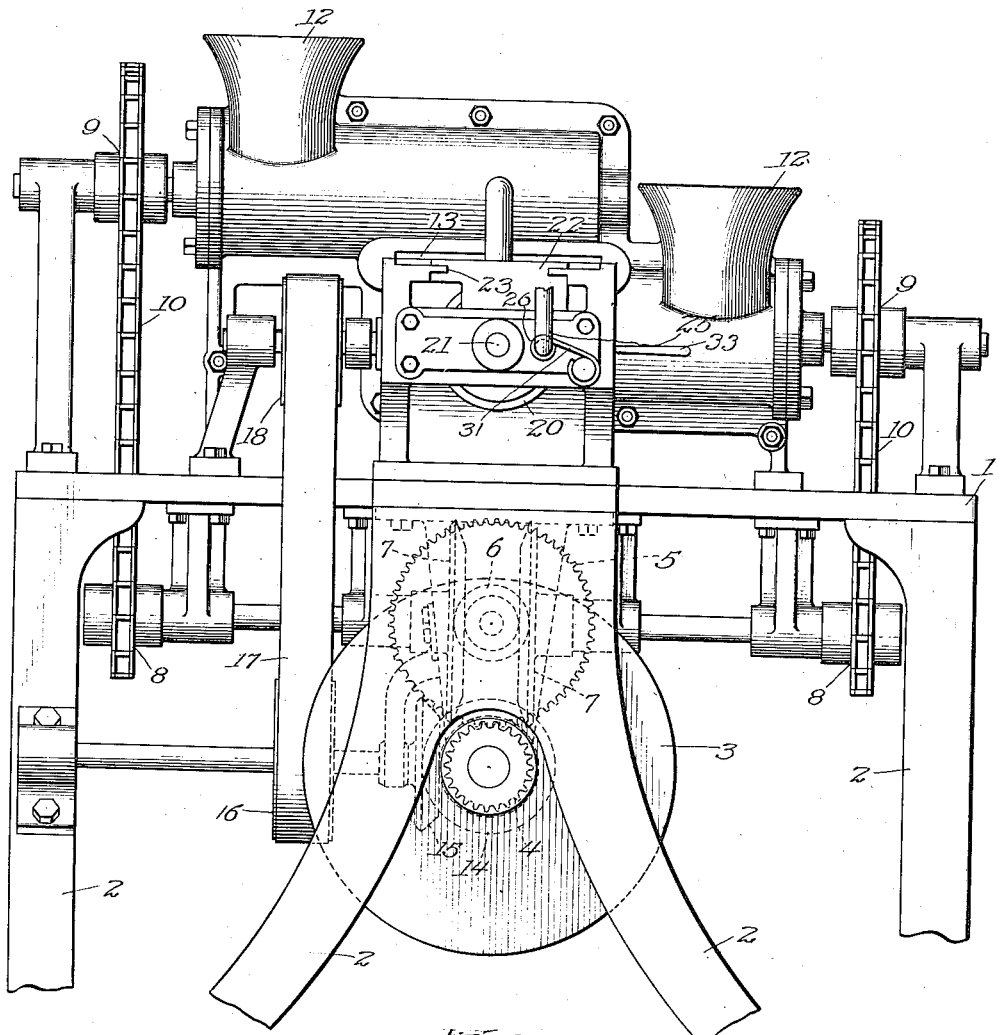

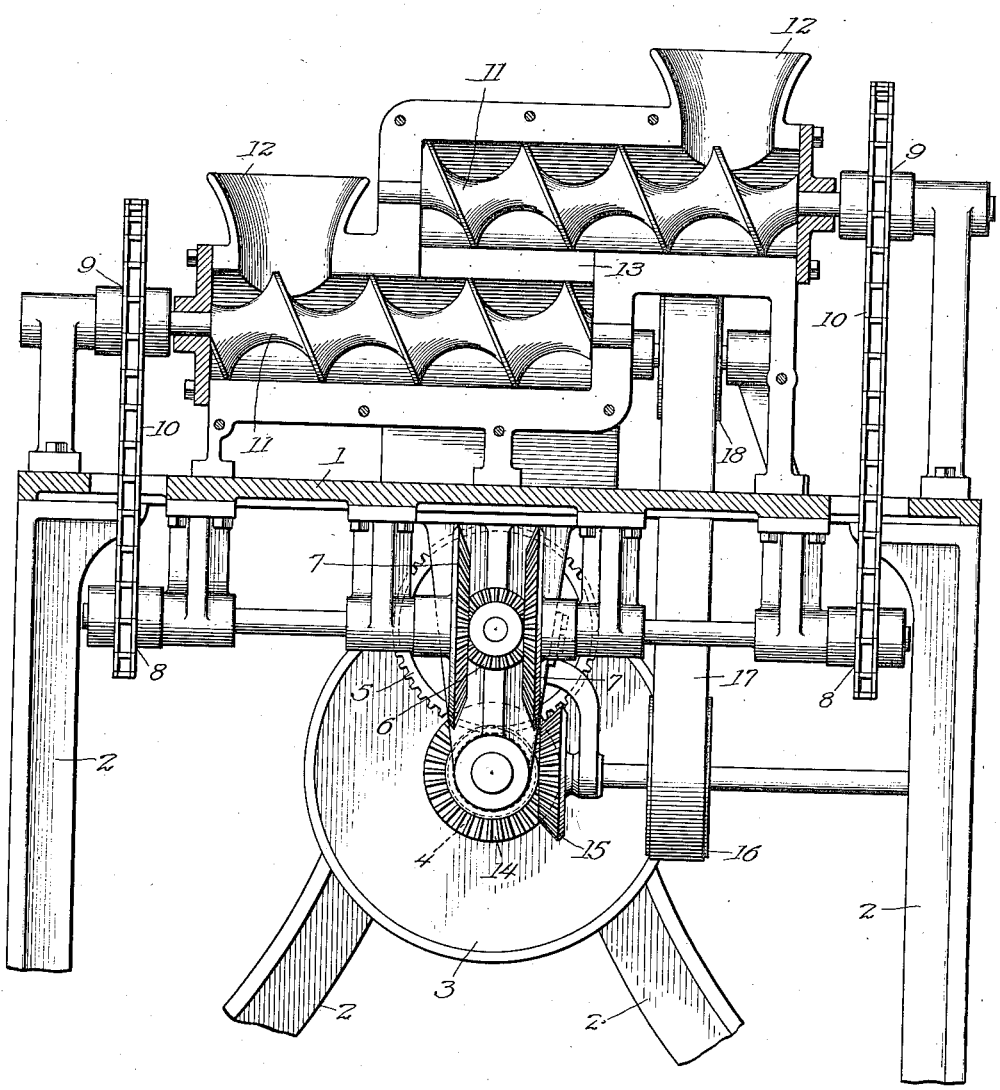

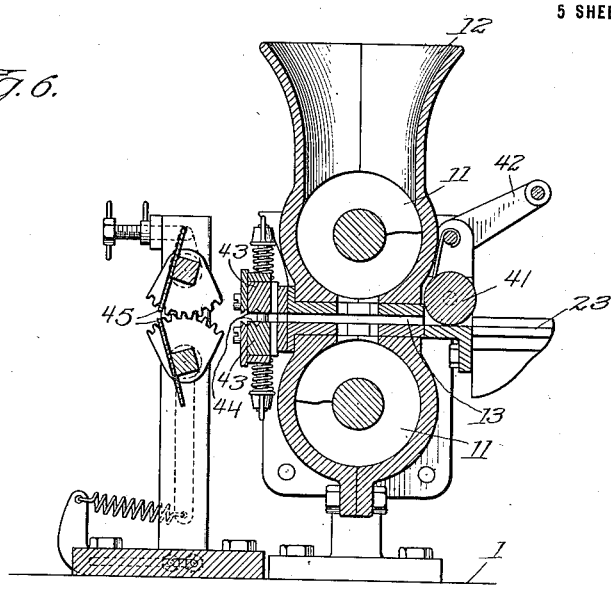
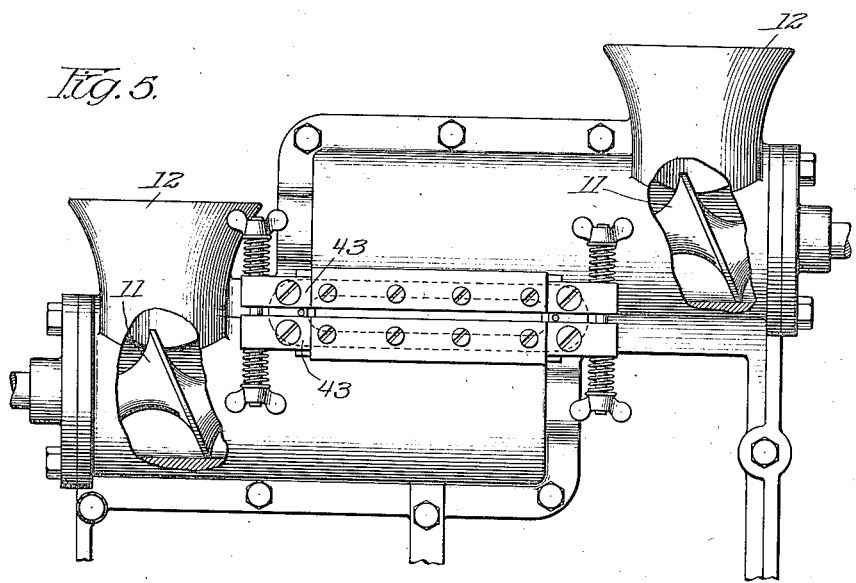

FRANK ENGEL, OF NIAGARA FALLS, NEW YORK, ASSIGNOR, BY MESNE ASSIGNMENTS, TO CENTRAL TRUST COMPANY OF NEW YORK, A CORPORATION OF NEW YORK, TRUSTEE.

PASTING-MACHINE.

1,147,009.     Specification of Letters Patent.     Patented July 20, 1915.

Application filed September 3, 1912. Serial No. 718,346.

*To all whom it may concern:*

Be it known that I, FRANK ENGEL, a citizen of the United States, residing at Niagara Falls, in the county of Niagara and State of New York, have invented new and useful Improvements in Pasting-Machines, of which the following is a full, clear, concise, and exact description, reference being had to the accompanying drawing, forming a part of this specification.

My invention relates to machines for pasting storage battery grids.

Certain of the broad features illustrated in this application are disclosed and claimed in Patent No. 1,039,715, October 1, 1912, the application for which was co-pending herewith.

The object of the present invention is to provide an improved machine for filling battery grids with paste, for packing the paste therein and for trimming off the surplus and giving a finished appearance to the completed product.

The machine illustrated in the accompanying drawings represents the preferred embodiment of the invention.

The views in the drawings are as follows:

Figure 1 is a side elevation of the machine partly in section. Fig. 2 is a top plan view thereof. Fig. 3 is an end elevation thereof. Fig. 4 is a sectional elevation through the paste receptacles. Fig. 5 is an elevation of the outlet side of the paste receptacles. Fig. 6 is a sectional elevation taken centrally through Fig. 5. Fig. 7 is an elevation of one of the grid holders. Fig. 8 is a top plan view thereof. Fig. 9 is an elevation of a detail. Fig. 10 is a top plan view of one of the scraping blocks. Fig. 11 is a section thereof on line 11—11 of Fig. 10. Fig. 12 is a side elevation of a detail. Fig. 13 is a plan view of an automatic latch.

The following brief description will serve to render clear the main elements of the machine and the operation thereof. The oxids or paste is supplied to two suitable hoppers and is fed by two screw conveyers toward a common point from opposite directions. The battery grids or frames which are to be pasted are fed in continuous succession through an opening near the adjacent ends of the screw conveyers, one of which is arranged above the other. The screw conveyers force the paste into the battery grid from above and below the same simultaneously as it passes through the said opening. Suitable scrapers are arranged, between which the filled grids must pass as they are leaving the conveyers. These scrapers pack the paste into the grid, trim off the surplus paste, and give a smooth finish to the surface of the battery grid.

The details of the machine will now be described. A suitable bed plate or table 1 is supported by legs 2. The paste receptacles and conveyers are located preferably above said bed plate and the driving mechanism is located below said bed plate. Power is transmitted to the pulley 3 and transmitted therefrom through the gears 4, 5 to the middle member 6 of the differential gear. The other two beveled gears 7 which go to make up said differential gear are rotated in opposite directions by said middle member 6 and through the sprocket wheels 8, 9 and connecting chains 10, the screw conveyers 11 are rotated in a direction to feed the paste from the hoppers 12 toward the opening 13. The pulley 3 also drives directly a beveled gear 14 which meshes with a second beveled gear 15, on the same shaft with which, is arranged a pulley 16 from which a belt 17 drives a second pulley 18. On the same shaft with the pulley 18 is a beveled gear 19 driving a second beveled gear 20 which rotates a screw threaded shaft 21. This shaft rotates continuously and is adapted to cause the carriage 22 to travel from left to right as seen in Figs. 1 and 2. Said carriage slides in suitable ways 23. Its engagement with the screw threaded shaft 21 is effected through a block 24 having screw threads which fit the screw threads of said shaft 21. Said block may be moved into mesh with the threads on the shaft 21 by manipulating the operating handle 25. The details of this arrangement are shown in Fig. 9. The operating handle 25 is preferably a continuation of the rod 26 which is provided with an eccentric 27 turning loosely in an opening in the block 24. Said block is received in an opening 28 in the carriage 22 and is guided by the walls of said opening whereby it may be moved back and forth by partial rotation of said eccentric. When the carriage 22 reaches the limit of its forward travel, the block 24 is automatically pushed aside to cause the disengagement of the same from said screw threaded shaft 21.

The automatic means for disengaging the half nut from the screw threaded shaft is shown more particularly in Figs. 2, 12 and 13. The shaft 26 is provided at one end with an enlarged hub 29 which is rotatably mounted in the bracket 30, the latter being cast preferably as part of the frame. The shaft 26 is held normally with the handle 25 arranged horizontally due to the spring 31. In this position the half nut or block 24 is disengaged from the screw threaded shaft 21. The half nut may be caused to engage said screw threads whenever the handle 25 is moved through a quarter revolution to vertical position against the action of the spring 31. The hub 29 carries a pin 32 (see Fig. 13). Said pin engages the inner end of the lever or latch 33 whenever the handle 25 is in vertical position and consequently maintains the half nut in engagement with the screw threads on the shaft 21. The latch 33 is pivoted at the point 34 and is normally held in the position shown by a spring 35, the action of which is resisted by an adjustable stop 36. Whenever it is desired to return the carriage 22, the operator grasps the handle 33 and imparts a slight rotation thereto, thereby releasing the pin 32 and permitting the spring 31 to rock the shaft 26 to its normal position, thereby disengaging the half nut 24 from the screw threaded shaft.

If the latch is not operated by hand, the same is operated automatically at the end of the forward travel of the carriage by means of the projecting pin or arm 37 which strikes the latch 33 and thereby releases the pin 32 in the same manner previously described.

The empty grids are adapted to fit into the opening in the frame or grid holder 38 shown in Figs. 7 and 8. Said grid holders are preferably recessed at one end, as shown at 39, and provided with a double bevel at the other end 40 whereby each holder may fit into and be locked in the preceding holder when the holders are being moved in a continuous series. Said holders are guided by the ways 23 and advanced by the traveling carriage 22 and thereby forced in continuous succession through the opening 13 of the pasting device.

It is apparent that the carriage 22 may be released and drawn back at any time to permit the insertion of additional grid holders between said carriage and the last grid holder of the preceding series. In other words, the machine may be kept in almost continuous operation with an endless succession of grid holders and grids passing through the opening and receiving paste from the screw conveyers.

As the grid holders which contain the grids advance to the opening 13, they pass under and are held down by a spring pressed roller 41. (See Fig. 6.) Said roller may be swung outwardly by moving the lever 42 when desired. The paste is forced into the grids both from above and below, as will be apparent from an inspection of this figure. As the grid emerges, it passes between a pair of spring pressed scraping blocks 43, one of which is shown more in detail in Figs. 10 and 11. Both blocks on their adjacent faces are provided with diagonally arranged ridges 44. These ridges scrape off the surplus paste and also serve to further pack the paste into the grid. The diagonal arrangement of the ridges has been found to result in a very effective packing and scraping action. The plate is further scraped smooth and given a finished appearance by passing between the yielding blades 45. The finished grid as it passes these scrapers may be received on to a suitable table, traveling belt or other suitable support, or may be removed manually if desired.

In the above machine the grids move in a horizontal plane, as they are being pasted, and accordingly one paste conveyer is arranged above the other. Of course, I do not limit myself to this relative arrangement of the parts, nor to the other details of construction and arrangement of parts shown and described. In general, I desire to cover suitable equivalent means for accomplishing the desired results whenever said means fall within the scope of the appended claims.

What I claim as new and desire to secure by Letters Patent of the United States is:

1. A pasting machine comprising a support for the object to be pasted, and screw-conveyers for advancing paste toward said object.

2. A pasting machine for battery grids comprising a support for the object to be pasted, receptacles for the paste, and screw-conveyers for conveying paste from said receptacles to said object.

3. In a machine for filling battery grids, means for supporting a grid, and screw conveyers for conveying paste from a paste receptacle to opposite sides of said grid, said conveyers also serving to force the paste into opposite sides of said grid.

4. In a machine for applying paste, means for containing the paste, passage-ways from said containing means to opposite sides of the article to be pasted, said passage-ways having openings adjacent said article and screw conveyers adapted to force paste along said passage-ways and through said openings.

5. In a machine for applying paste, a plurality of hoppers, a transverse passage-way communicating with one end of each hopper, said passage-ways having adjacent discharge openings, screw conveyers in said passage-ways for conveying paste from said hoppers through said passage-ways and for forcing the paste through said discharge openings, and guides for guiding the object to be pasted in proximity to said discharge openings, whereby paste may be applied to a plurality of points on the surface of said object simultaneously.

6. A battery grid filling machine having means for advancing a grid, means for filling said grid with paste as it advances, means for packing and scraping said grid after it has been filled, and additional means for scraping and smoothing said grid.

7. A battery grid filling machine having means for advancing a grid, means for filling said grid with paste as it advances, means for packing and scraping said grid after it has been filled, and additional means for scraping and smoothing said grid, said scraping and packing means comprising a pair of yieldingly mounted spring pressed blocks.

8. In a grid pasting machine, means for guiding a grid, means for advancing paste toward opposite sides thereof, a roller for holding said grid to said guides as it advances, and means for packing and scraping said grid after it has been filled with paste.

9. In a grid pasting machine, a pair of scrapers each comprising a yieldingly mounted block having diagonally arranged ribs thereon.

10. In a grid pasting machine, a scraping mechanism comprising a pair of opposed blocks yieldingly mounted, each of said blocks having ribs thereon, said ribs being arranged diagonally with respect to the line of travel of the grid.

11. Scraping mechanism for a grid pasting machine comprising a pair of resiliently mounted blocks between which the grid is adapted to pass, said blocks having opposed corrugated surfaces, and each having a scraping knife secured thereto.

12. In a grid pasting machine, a pair of opposed blocks for packing paste into opposite sides of the grid, and a pair of independent scraping knives for scraping the opposite surfaces of said grid.

13. In a grid pasting machine, a pair of opposed blocks for packing paste into opposite sides of the grid, and a pair of independent scraping knives for scraping the opposite surfaces of said grid, said scraping knives being held in yielding contact with said surfaces.

14. In a grid pasting machine, means for advancing grids in continuous succession, said means including a plurality of interfitting blank holders.

15. In a grid pasting machine, means for advancing the grids, said means including a sliding carriage, a screw-threaded shaft and a block having threads for engaging the threads of said shaft, said block being eccentrically mounted.

16. In a grid pasting machine, means for advancing the grids, said means including a sliding carriage, a screw-threaded shaft and a block having threads for engaging the threads of said shaft, said block being eccentrically mounted, and a latch actuated by said carriage for disengaging said block from said shaft.

17. In a machine for applying paste, means for advancing a grid, a plurality of paste receptacles having registering openings, screw conveyers for forcing the paste through the registering openings in said receptacles so as to fill said grid, and means for packing and scraping said grid after it has been filled.

In witness whereof, I have hereunto subscribed my name in the presence of two witnesses.

FRANK ENGEL.

Witnesses:
 JAMES L. COUGHLIN,
 H. G. REESE.